United States Patent [19]

Barnes et al.

[11] 4,298,290
[45] Nov. 3, 1981

[54] SYSTEM AND PRINTER JUSTIFICATION SYSTEM

[75] Inventors: Johnny G. Barnes; Patrick J. Hurley; Gary W. Miller, all of Austin, Tex.

[73] Assignee: International Business Machines Corporation, Armonk, N.Y.

[21] Appl. No.: 159,552

[22] Filed: Jun. 16, 1980

[51] Int. Cl.³ .............................................. B41J 5/30
[52] U.S. Cl. ......................................... 400/3; 400/12
[58] Field of Search .................... 400/3, 4, 5, 6, 9, 10, 400/12, 63, 64; 364/200 MS File, 900 MS File; 354/8, 9

[56] References Cited

U.S. PATENT DOCUMENTS

| | | | |
|---|---|---|---|
| 2,379,862 | 7/1945 | Bush | 400/12 X |
| 2,678,712 | 5/1954 | Higonnet | 400/12 X |
| 2,973,080 | 2/1961 | Higonnet et al. | 400/12 X |
| 3,654,611 | 4/1972 | Bluethman et al. | 400/6 X |
| 3,674,125 | 7/1972 | Kolpek | 400/5 |
| 3,690,231 | 9/1972 | Storch | 400/6 X |

OTHER PUBLICATIONS

*IBM Tech. Disc. Bulletin*, by E. J. Lincoln et al., vol. 4, No. 12, May 1962, pp. 67–70, 400–403.
*IBM Tech. Disc. Bulletin*, by P. J. Wheeler, vol. 19, No. 6, Nov. 1976, pp. 1965, 400–412.
*IBM Tech. Disc. Bulletin*, by T. R. Tetiva, vol. 21, No. 11, Apr. 1979, pp. 4642–4644, 400–409.

*Primary Examiner*—Paul T. Sewell
*Attorney, Agent, or Firm*—James H. Barksdale, Jr.

[57] ABSTRACT

A system for first justifying a text line according to a system minimum escapement unit, and then rejustifying the line according to a minimum escapement unit for a printer which is to be utilized in printing the line. The first justification of the line is in a normal manner. That is, any residue is divided by the number of word spaces on the line to obtain a quotient and any remainder. The extent of word space expansion is then the value of the quotient plus the remainder until exhausted. Rejustification for the printer being utilized is accomplished by dividing each system justified word space size by the printer minimum escapement unit to obtain a new quotient and remainder. Each system justified word space is then converted to a value including the obtained quotient for each space, and the remainders for all spaces are accumulated for adding to the first word space.

10 Claims, 10 Drawing Figures

UNJUSTIFIED LINE

SYSTEM JUSTIFIED LINE 100%

PRINTER ESCAPEMENT DEPENDENT JUSTIFIED LINE 100%

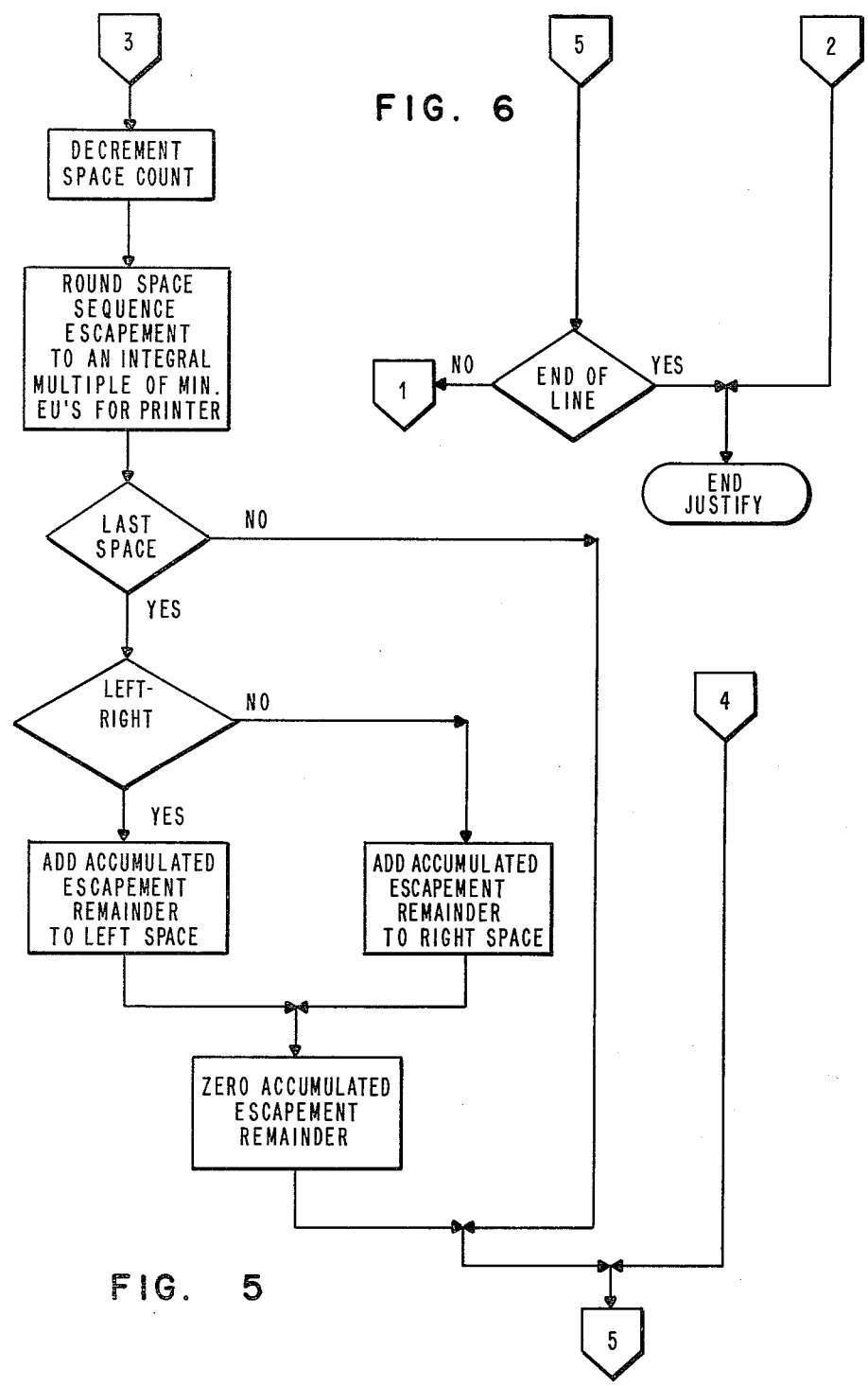

SYSTEM AND PRINTER JUSTIFICATION SYSTEM

DESCRIPTION

BACKGROUND OF THE INVENTION

1. Field of the Invention

This invention generally relates to justification of text lines. More specifically, this invention relates to a justification system for accommodating a plurality of printers, each having differing units of minimum escapement.

2. Description of the Prior Art

Many justification systems and techniques exist in the prior art. These systems and techniques vary from attempts to (1) obtain apparent equal word space sizes to (2) providing an operator with flexibility in determining maximum space size expansion for high quality printing. Absent from the prior art though, are double pass justification systems adaptable to a wide range of printers and not subject to material losses in print quality. With this invention, text lines are first system justified in a straightforward manner, and then rejustified for the printer in use. Briefly, space expansion within a line is derived from a residue during system justification. During rejustification, space expansion is limited to one space and is based on an accumulation of remainders from a space size reduction of other spaces. The line thus prepared is capable of being accepted and printed by the printer. The end result is high quality printed text obtained without resorting to complicated apparatus and techniques.

SUMMARY OF THE INVENTION

A system is provided for accommodating a plurality of different printers having differing units of minimum escapement. The system first justifies text lines in memory without regard to the printer and in a normal manner utilizing a system minimum escapement unit. That is, a text line is scanned for obtaining a count of the number of word spaces in the line and the number of escapement units in the residue. Thereafter, the residue is divided by the number of word spaces on the line. The word spaces are then expanded to the extent of the obtained quotient and any remainder until exhausted. Exhaustion of the remainder results in large word spaces on the end of the line upon which scanning begins. Following system justification, the line is to be printer justified or rejustified in memory. This is accomplished by again scanning the line. When a word space is detected, it is divided by the minimum escapement unit of the printer to be used. The obtained quotient is then multiplied by the minimum printer escapement unit, and any remainder is accumulated. The word space size is thereafter converted to the obtained product. The division and conversion operations are repeated for each space detected on the line. When the end of the line is detected, all accumulated remainders are added to the first space detected during scanning to form a new space size. The line is now capable of being accepted and printed by the printer.

BRIEF DESCRIPTION OF THE DRAWING

FIGS. 3, 4, and 5 are flow charts illustrating the steps followed in justifying text lines according to this invention.

DESCRIPTION OF THE PREFERRED EMBODIMENT

Figure 1:
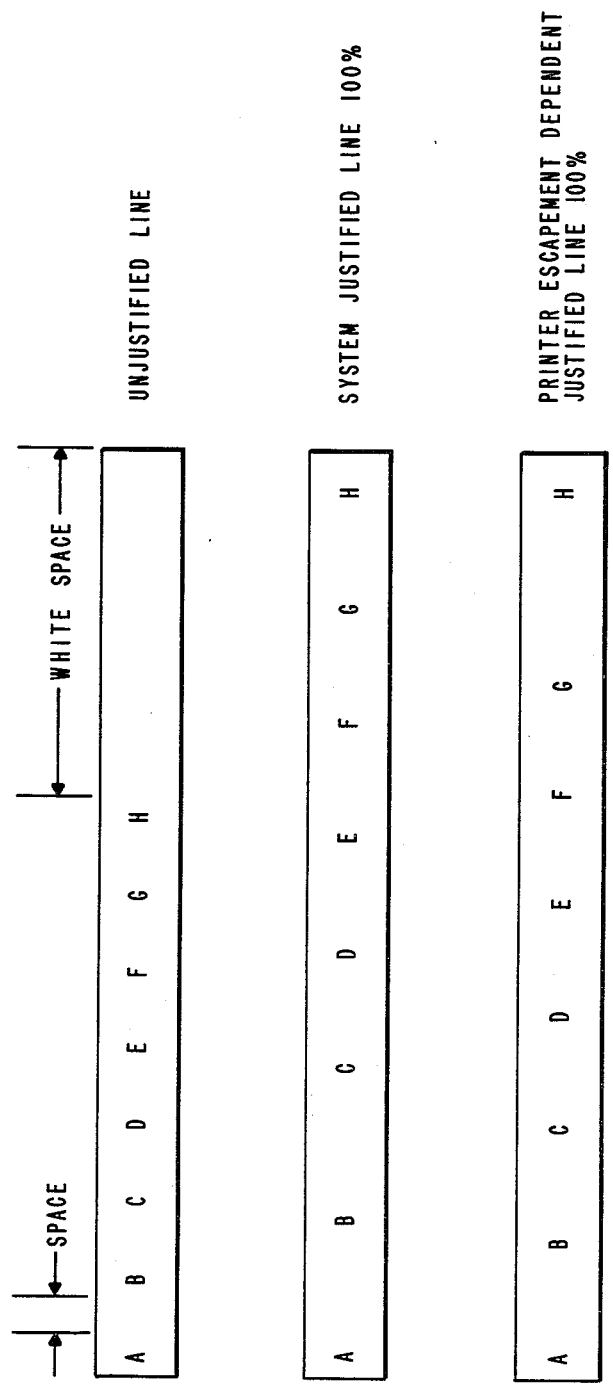
FIG. 1 illustrates a text line as stored, system justified and printer justified.

For a more detailed understanding of the invention, reference is first made to FIG. 1. The first or upper block shown in this figure is a representation of an unjustified text line stored in a system text storage buffer. The letters A-H represent words made up of characters. The spacing between the words includes word spaces which are equal in width and defined in terms of a specified number of system minimum escapement units. Words and characters making up words have widths which are multiples of the system minimum escapement unit. The left and right sides of the block represent the settings of the left and right margins on a printer to be utilized in ultimately printing the line. The white space beyond the last word of the line is the line residue. The line is to be transferred from a text storage buffer to a line buffer or memory and first system justified to cause the words to extend between the left and right margins. That is, the residue is to be distributed among the word spaces. The system justification operation is begun by dividing the width of the residue by the number of word spaces on the line. The obtained quotient and any remainder are then distributed among the spaces to cause first and last words to abut the left and right margins as shown in the middle block of FIG. 1. If upon division, there is no remainder, then the spacing between the words in the middle block will be equal. As shown though, as is the case in most instances, there will be a remainder which is distributed among the first spaces encountered until exhausted. For example, there are seven spaces between the words represented by A-H. If the residue is equal to 16 escapement units, then each space in the unjustified line is to be expanded two escapement units. This is because the quotient is equal to two. The remainder is also equal to two. In addition, if the line is to be operated on beginning at the left margin, one escapement unit of the remainder is added to each of the spaces between the A and B, and B and C. Now obtained is a system justified line ready for printer justification (rejustification).

Since different printers often have different minimum escapement units which also differ from the minimum escapement unit of the system, the line must be rejustified by the system for the printer to be utilized. Rejustification is accomplished upon scanning the line in the line buffer and dividing each expanded system space size by the printer minimum escapement unit. The obtained quotient for each space is a factor which is then multiplied by the printer minimum escapement unit. Each system space size is then converted to the obtained product, and any remainders are accumulated. The line is again scanned and the first detected or encountered space is converted to a space size including the accumulated remainders.

The lower block of FIG. 1 is representative of a line which has been both system and printer justified beginning from the right margin. The large space between the G and the H and remaining equal size spaces could have resulted from a remainder of one during system justification and a high accumulated remainder during printer justification. Although, there are instances where the occurrence of one large space can be less than desirable for a single line, when an entire page is considered, the effect is still high quality justified text. As will be pointed out later herein, the end of the line upon which spaces are expanded alternates with each succeeding line. With this being the case, large spaces occur on alternating ends of the lines and rivers of white are avoided.

A point to note is that in cases where the minimum escapement unit for a system is smaller than the minimum escapement unit for an included printer, there will be a reduction in at least some of the space sizes along a line. This is due to the fact that when remainders exist upon printer justification, the remainders are in effect taken away from the spaces. Another point to note is that once the lines have been printer justified, actual printing can occur in either direction. This is even though the lines are operated upon in alternate directions.

Figure 2:
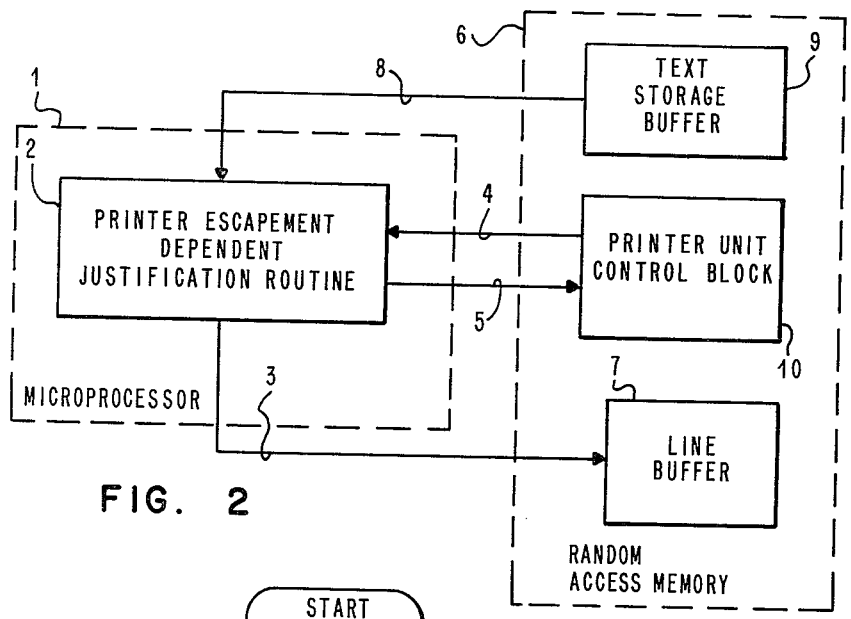
FIG. 2 is a block diagram representation of a system utilized for justifying text lines according to this invention.
Figure 3:
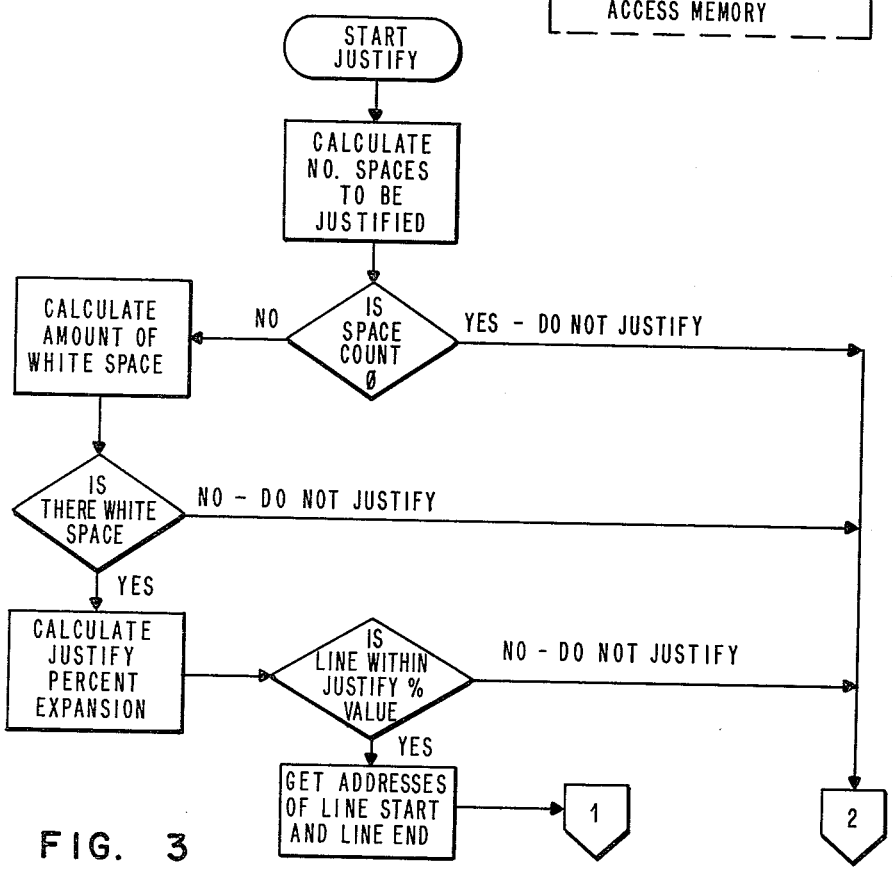
Figure 4:
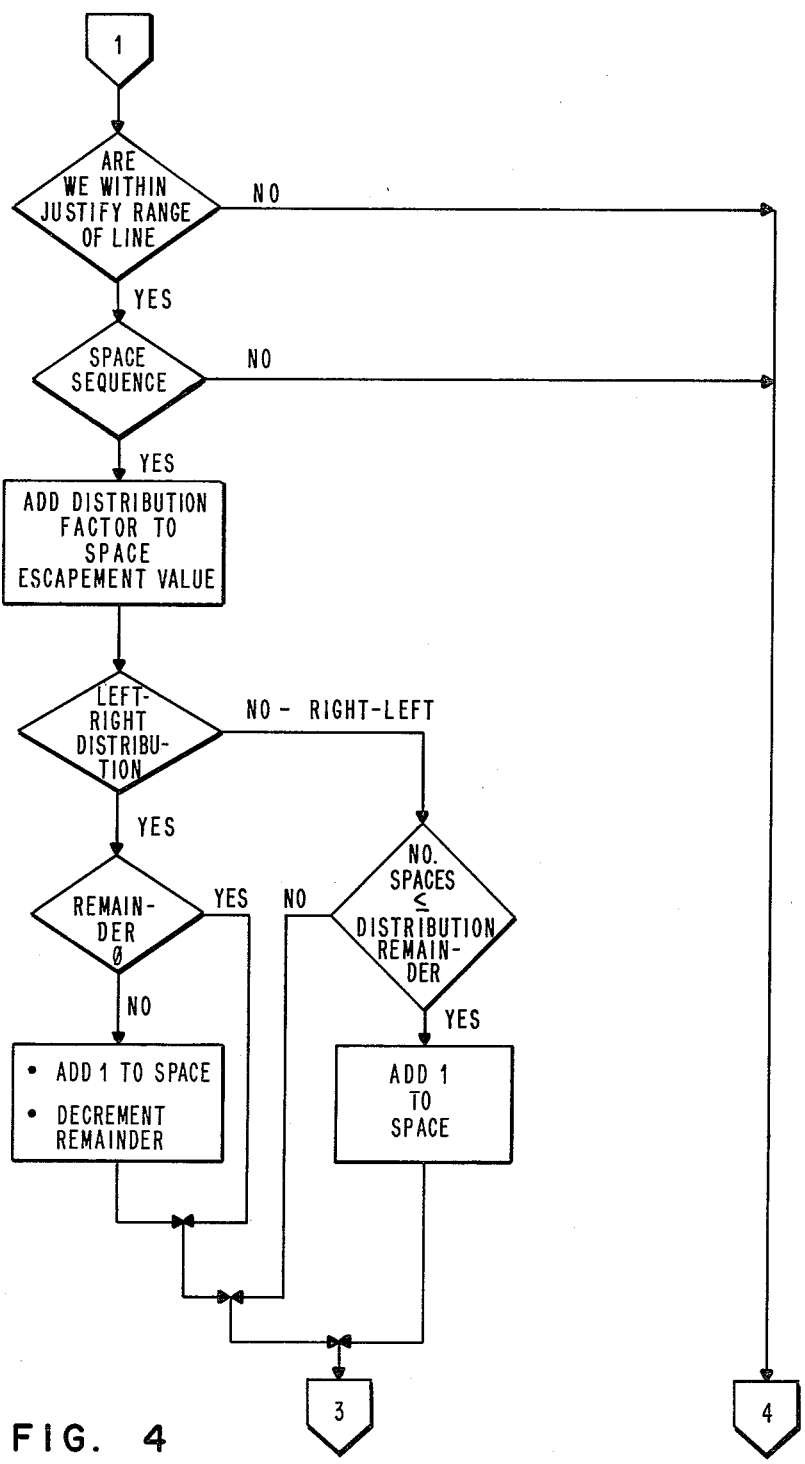

Referring next to FIG. 2, there is shown a simplified block diagram of the system for handling the above described system and printer justification of text lines. Briefly, a microprocessor 1 is programmed with a printer escapement dependent justification routine 2 for (1) taking a text line along line 8 from a text storage buffer portion 9 of a random access memory 6, (2) formatting the line in terms of justification, and (3) outputting and retrieving the line along two way line 3 to and from line buffer 7. One line at a time is transferred from buffer 9 to buffer 7, operated upon in terms of system and printer justification, and then transferred to a printer for printing.

The minimum escapement unit for the printer to be utilized, as well as other justification parameters such as minimum system escapement unit and space escapement are input to microprocessor 1 along line 4 from printer unit control block 10. Output along line 5 to block 10 from microprocessor 1 are space count, quotient, remainder, accumulated filter (printer) remainder, etc.

Reference is next made to the flow charts of FIGS. 3, 4, 5, and 6. These flow charts are representative of the decisions and operations performed and controlled by microprocessor 1 and printer escapement dependent justification routine 2 in FIG. 2. Upon a start justify command or signal, a text line stored in text storage buffer 9 is transferred to buffer 7 and scanned to calculate the number of word spaces within the line. If there are no spaces, justification is not called for as illustrated in FIG. 6. The next line is then scanned. If spaces exist within the line, scanning continues to determine the width of the residue between the last character on the line and the following margin. If there is no residue, then justification is again not to occur. If there is a residue, the residue is divided by the number of spaces to determine a space expansion factor (quotient) and a remainder in system escapement units. A decision is then made as to whether expansion can occur within the limits of the system. Determining space expansion and whether a line can be justified is primarily related to percent justification. One hundred percent justification has been contemplated thus far and is the main objective of this invention. It is only noted that there are instances where less than full justification is desirable. If the line can be justified, the line start and line end addresses in buffer 9 are sought. A decision is then made as to whether operation is within a justifiable range of the line. If so, the line is again scanned based on the line start address and a space is sought. Upon detection of a space, the space expansion factor is added to the minimum space size. As alluded to earlier, all stored spaces are assigned a minimum space size defined as a preselected number of system minimum escapement units. Thereafter, a determination is made as to whether there is to be left or right distribution. This is dependent upon the direction of scanning. If scanning is from left to right, a decision is made as to whether there is any remainder. If a remainder does exist and it is greater than zero, one escapement unit is added to the already expanded space. If there is no remainder, the space count is decremented and the next space is sought. On the other hand, if scanning is from right to left, a determination is made as to whether the number of spaces is equal to, or less than, the remainder. If not, then the space count is decremented and the next space is sought. If so, one escapement unit is added to the already expanded space.

Following a decrementing of the space count to zero and completion of system justification of the line, the line is to again be scanned.

The block labelled Round Space Sequence Escapement to an Integral Multiple of Minimum Escapement Units for Printer in FIG. 5 represents the following described operations. Scanning for printer justification of a line begins in the same direction as scanning for system justification. Depending on the direction, either the line start or line end address is sought. Upon detection of a system expanded space, the space size is divided by the printer minimum escapement unit. The quotient is multiplied by the printer minimum escapement unit and the remainder is accumulated. The system expanded space is updated with the product. The above operations are repeated for each space on the line. Following operation on the last space, a decision is made as to whether there is to be left to right distribution. If the decision is yes, the accumulated remainder is added to the leftmost space. If the decision is no, the accumulated remainder is added to the rightmost space. Thereafter, the register storing the accumulated escapement remainder count is reset to zero for beginning operation on the next line.

Referring next to FIGS. 7, 8, 9, and 10, there is illustrated the structure included in FIG. 2. This structure is operated upon and utilized in accordance with the flow charts of FIGS. 3-6. In the top left portion of FIG. 7 there is shown a space counter 20 having an output along line 21 to multiplier 29. Counter 20 forms part of block 10 and is loaded upon an intital scan of the line for system justification. The output along line 21 is also applied along line 22 to divider 23. The other input to divider 23 is from a white space register 24 along line 25. White space register 24 is loaded with the width of the residue which is determined upon an initial scan of the line for system justification. Another output from white space register 24 is along line 26 to adder 33. The output of divider 23 is along line 28 to multiplier 29 and along line 27 to quotient register 35. The output of multiplier 29 is along line 30 to inverter 31 and then along line 32 to adder 33. The output of adder 33 is along line 34 to remainder register 36. Following the division, multiplication, and adding operations, the factors for determining system space expansion are stored in registers 35 and 36. Registers 35 and 36 form part of block 10. Blocks 23, 29, 31, and 33 form part of microprocessor 1.

Figure 7:
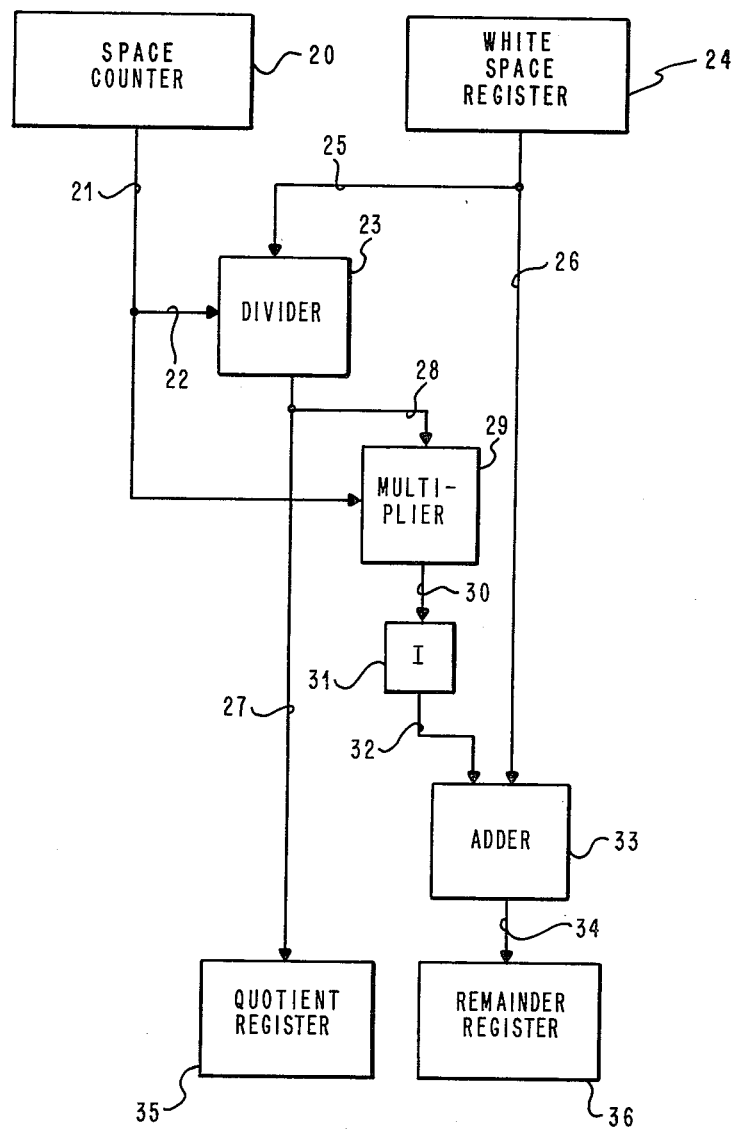
FIGS. 7, 8, 9, and 10 are block diagrams illustrating structure for justifying text lines according to this invention.
Figure 8:
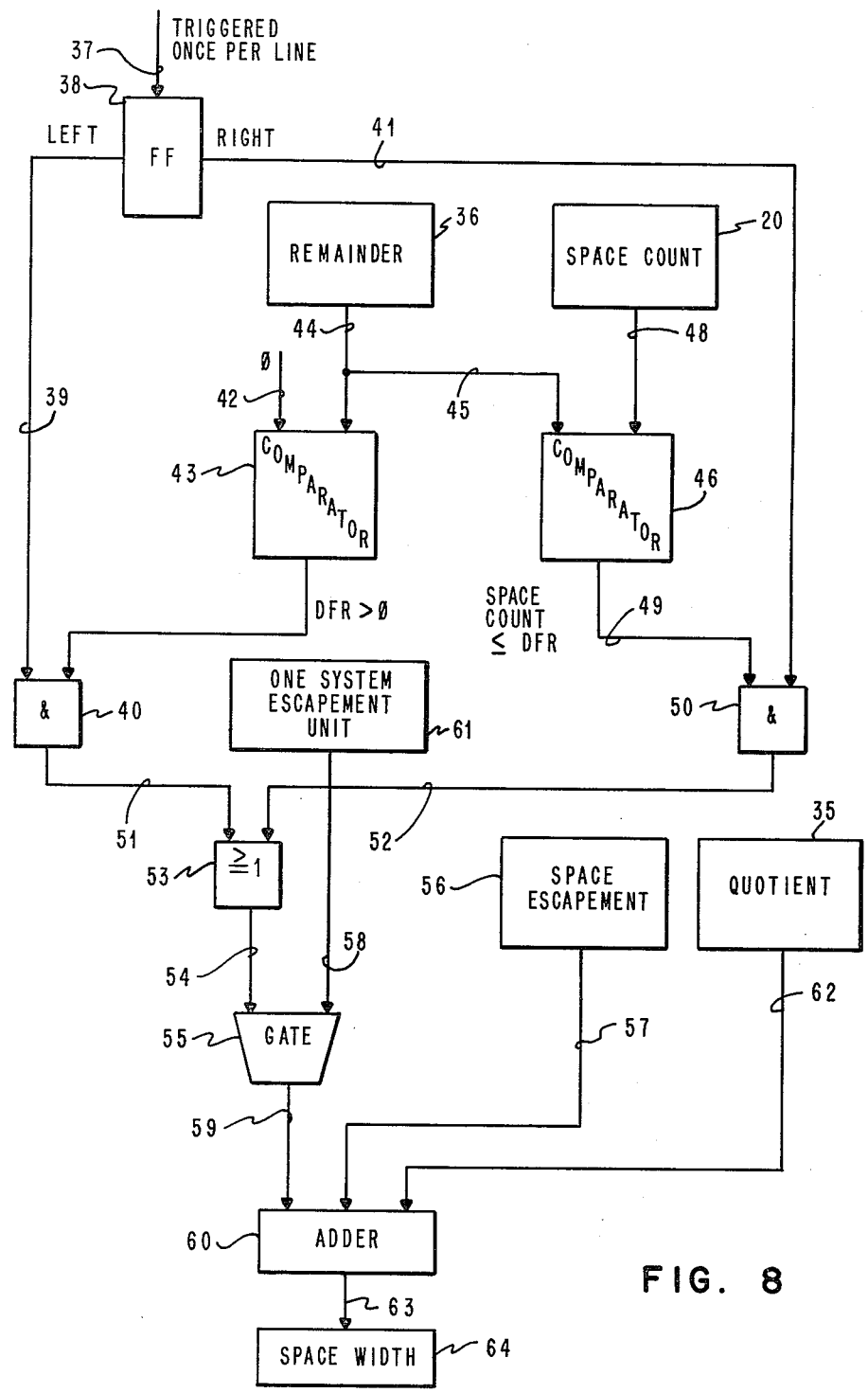
Figure 9:
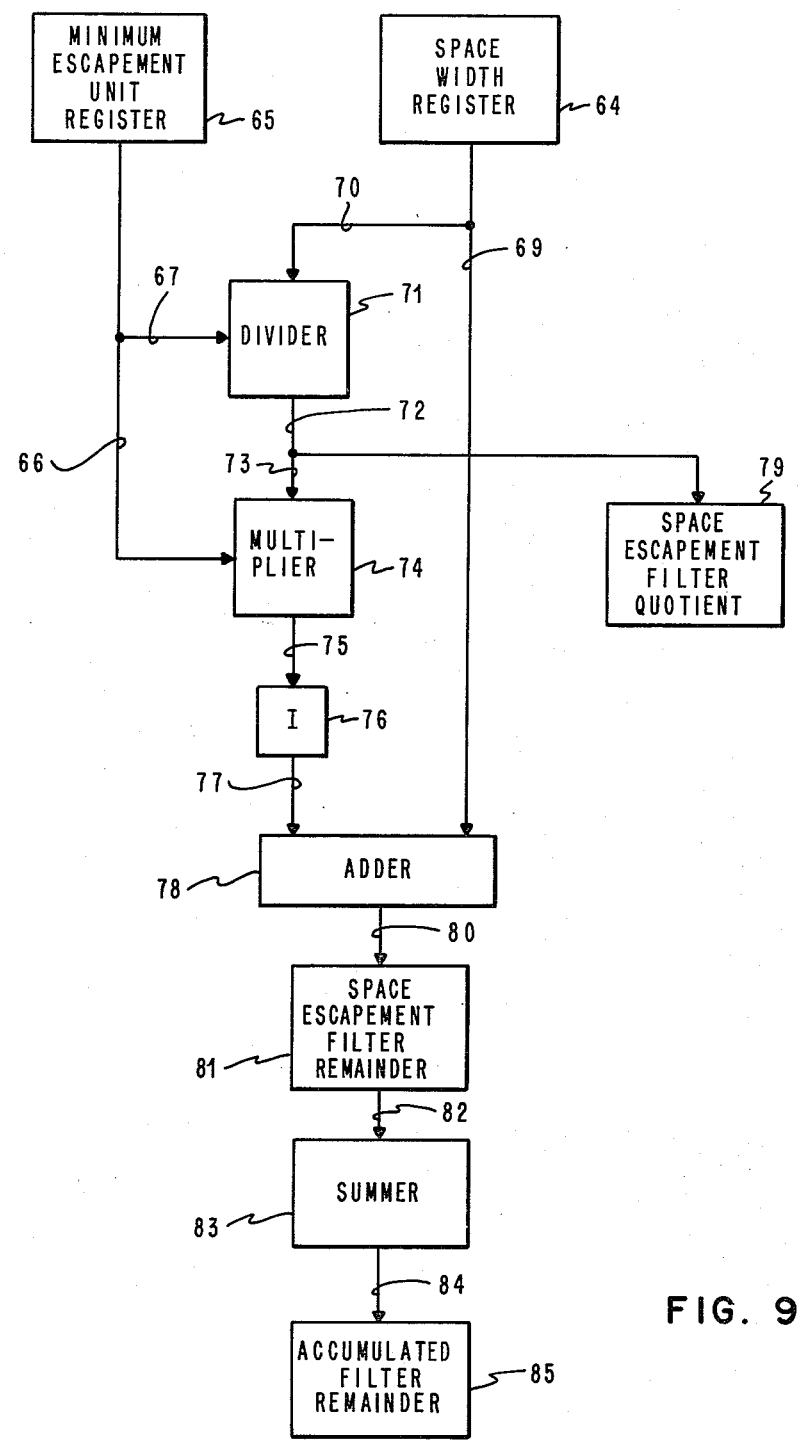

Referring next to FIG. 8 there is illustrated a flip-flop 38. Flip-flop 38 is triggered once per line by a signal applied along line 37 and controls the end of the line upon which expansion is to begin. If expansion is to begin on the left end of the line and adjacent the left margin, a signal is applied along line 39 to AND gate 40. If on the other hand, expansion is to begin from the right margin and extend toward the left margin, a signal is applied along line 41 to AND gate 50. The other input to AND gate 40 is derived from remainder register 36 shown again in this figure. The output of remainder register 36 is along line 44 to comparator 43 wherein the contents of register 36 are compared against zero along line 42. If the output of comparator 43 is greater than zero, an output is applied along line 51 from AND gate 40 to OR gate 53, and then along line 54 to gate bank 55. The output of remainder register 36 along line 44 is also applied along line 45 to comparator 46. The other input to comparator 46 is along line 48 from space counter 20. The output of comparator 46 is along line 49 to AND gate 50 when the count in space counter 20 is equal to, or less than, the remainder in register 36. Upon an output along line 49, there is an output from AND gate 50 along line 52 to OR gate 53, and then along line 54 to gate bank 55. Gate bank 55 is representative of a plurality of gates combined in such a manner as to permit an output along line 59 for adding, in adder 60, the contents of system escapement unit register 61 to the outputs of both register 56 along line 57 and quotient register 35 along line 62. Space escapement register 56 stores the minimum space size for the unjustified line. The output of adder 60 is along line 63 to register 64 wherein the new space size is stored. The space size stored in register 64 is used to effect a conversion of the original space size to the new space size. In actuality, the original space size is written over with the new space size. The above operation relative to the structure described in FIGS. 7 and 8 is repeated for each space.

With the line now system justified, the line must be rejustified for the printer in use. The minimum escapement unit for the printer in use is retrieved from block 10 and stored in register 65 in FIG. 9. The output of register 65 is along line 67 to divider 71. The other input to divider 71 is along line 70 from space width register 64. Register 64 is loaded upon a scan of the system justified line and the detection of a space. The output of divider 71 is along line 72 to quotient register 79 and along line 73 to multiplier 74. The other input to multiplier 74 is along line 66 from register 65. The output of multiplier 74 is along line 75 to inverter 76 and then along line 77 to adder 78. The other input to adder 78 is along line 69 from register 64. The output of adder 78 is along line 80 to remainder register 81 and then along line 82 to summer 83. The output of summer 83 is along line 84 to remainder register 85. The above operation is repeated for each space on the line.

Figure 10:
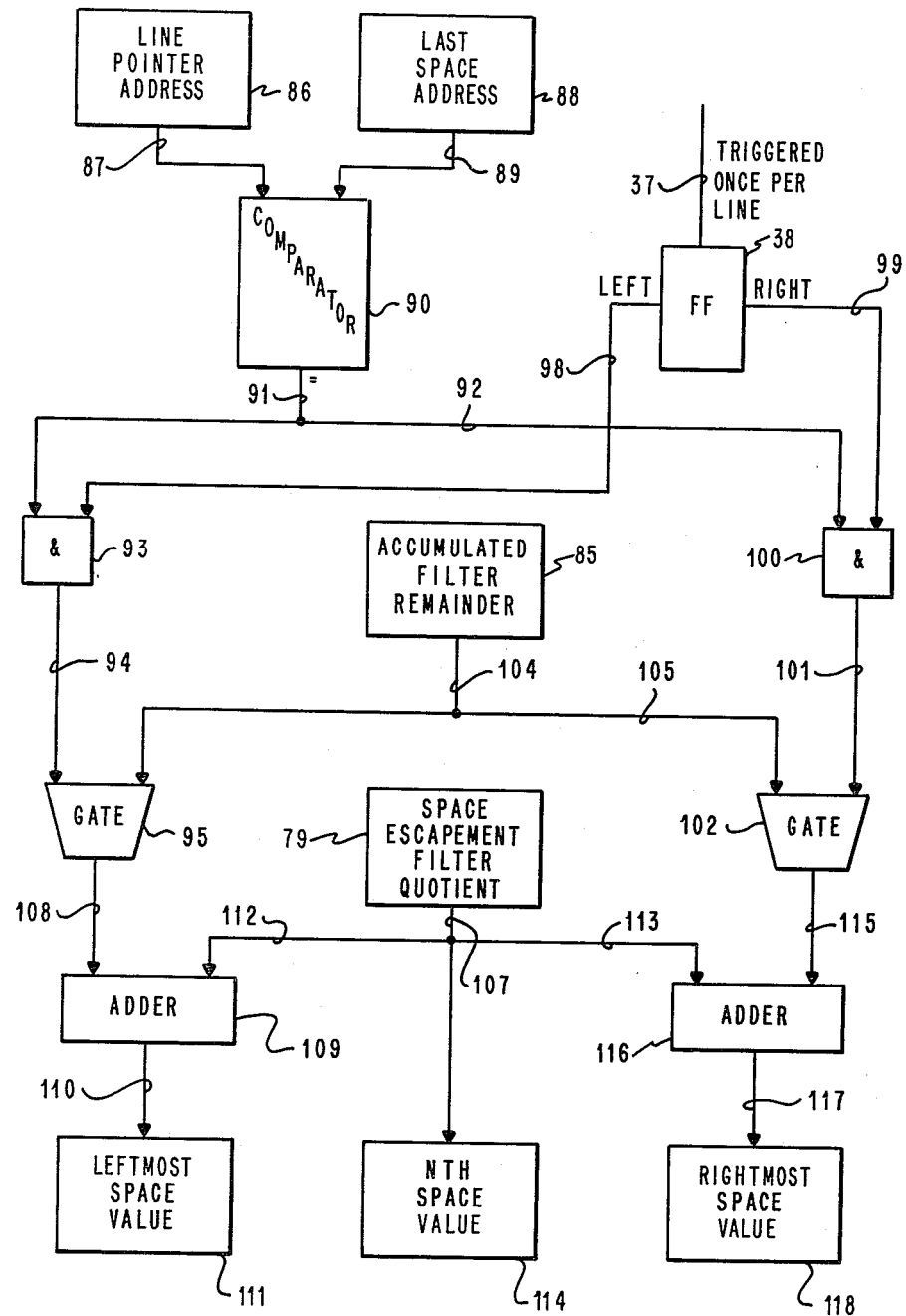

Referring next to FIG. 10, the line pointer address stored in register 86 is compared with the last space address stored in register 88. The address in register 86 is updatable during a scan of the line. The address in register 88 was loaded during the system justification operation. The output of register 86 is along line 87 to comparator 90. The output of register 88 is along line 89 to comparator 90. Upon a compare, an output is applied along line 92 to AND gates 93 and 100. The other input to AND gate 93 is along line 98 from flip-flop 38. Line 98 can be an addition to line 39 in FIG. 8. The output of AND gate 93 is along line 94 to gate bank 95. The other input to gate bank 95 is along line 104 from accumulated filter (printer) remainder register 85.

If the line is to be justified beginning from the right margin, an output is applied from flip-flop 38 along line 99. Line 99 can be an addition to line 41 in FIG. 8. The output of AND gate 100 is along line 101 to gate bank 102. Gate banks 95 and 102 are structured similarly to gate bank 55 in FIG. 8.

The output of gate bank 95 is along line 108 to adder 109. The other input to adder 109 is along lines 107 and 112 from register 79. The output of adder 109 is along line 110 to leftmost space value register 111. The value in register 111 is written over the space size stored in buffer 7. The output along line 107 is also applied to nth space value register 114 for subsequent spaces up to the last. The output along line 107 is also applied along line 113 to adder 116. The other input to adder 116 is along line 115 from gate bank 102. The output of adder 116 is along line 117 to rightmost space value register 118. Register 118 contains the accumulated remainder from register 85. This value is written into buffer 7 and over the space size stored therein.

A specific example is considered in order. The minimum system escapement unit is 1/1440, and the minimum space size is 120/1440 for the system. A 12 pitch printer utilized with the system has a minimum escapement unit of 1/60. In FIG. 1 there are 7 spaces and it is to be assumed that the white space or residue in 1200/1440. This is equivalent to 10 spaces. The units of measurement in the U.S. are defined in inches. For this example though, the units of measurement definition is immaterial. Upon system justification, there will be 3 spaces which are 292 system escapement units in width and 4 spaces which are 291 system escapement units in width. The width of the 3 spaces is obtained by dividing 1200 (residue) by 7 (spaces). The quotient is 171 units and the remainder is discarded in this step. The remainder determination is by subtracting 171 (units)×7 (spaces) from 1200 units. The remainder is 3 which is distributed evenly among the first three spaces in the direction of scanning. The space size for the first three spaces upon system justification is 120+171+1=292 system escapement units. For the last four spaces, the size is 120+171+0=291 system escapement units.

For printer justification with a 1/60 minimum printer escapement unit, the first three spaces (292) are divided by 24(1/60=24/1440) and the quotient is 12. The quotient is then multiplied by 24 and the product is 288. This value is written over the 292 for the first three spaces. Subtracting 288 from 292 leaves a remainder of 4. After operating upon the first 3 spaces, the accumulated remainder is 12. In like manner; the quotient for the last four spaces is 12, but the remainder is 3. The accumulated remainders for the last 4 spaces is 12 and the overall accumulated remainder is 24. The overall accumulated remainder is added to the first space operated upon, making this space 312 units in width. The 288/1440 spaces are translatable to 12/60 or 12 printer escapement units. The 312/1440 space is translatable to 13/60 or 13 printer escapement units.

In summary, a system is provided for accommodating a plurality of different printers having differing units of minimum escapement. The system first justifies text lines in memory without regard to the printer and in a normal manner utilizing a system minimum escapement unit. That is, a text line is scanned for obtaining a count of the number of word spaces in the line and the number of escapement units in the residue. Thereafter, the residue is divided by the number of word spaces on the line. The word spaces are then expanded to the extent of the obtained quotient and any remainder until exhausted. Exhaustion of the remainder results in large word spaces on the end of the line upon which scanning begins. Following system justification, the line is to be printer justified or rejustified in memory. This is accomplished by again scanning the line. When a word space is detected, it is divided by the minimum escapement unit of the printer to be used. The obtained quotient is then multiplied by the minimum printer escapement unit, and any remainder is accumulated. The word space size is thereafter converted to the obtained product. The division and conversion operations are repeated for each space detected on the line. When the end of the line is detected, all accumulated remainders are added to the first space detected during scanning to form a new space size. The line is now capable of being accepted and printed by the printer.

While the invention has been particularly shown and described with reference to a particular embodiment, it will be understood by those skilled in the art that various changes in form and detail may be made without departing from the spirit and scope of the invention.

What is claimed is:

1. A system for justifying text lines made up of characters, words, and spaces, and to be printed with a printer having a minimum escapement unit differing from a minimum escapement unit for said system, said system comprising:
    (a) means for scanning said line for determining a size of each word space in a line to be printed;
    (b) means for dividing each determined word space size by said printer minimum escapement unit to obtain a quotient and any remainder;
    (c) means for converting each determined word space size to a size including said quotient and accumulating said any remainder; and
    (d) means for adding said accumulated remainder to a size of a word space on said line.

2. A system according to claim 1 wherein said converting means includes means for converting the first word space encountered by said scanning means to a size including said accumulated remainder.

3. A system according to claim 1 wherein said scanning means includes means for initially scanning said line to determine the number of word spaces in said line and the size of any residue in system minimum escapement units, said word spaces being a number of system minimum escapement units in size;
    (a) means for dividing said residue size by said number of word spaces to obtain a quotient and a remainder in system minimum escapement units; and
    (b) means for adding said quotient, and one escapement unit from said remainder until exhausted, to each word space on said line to justify and line.

4. A system according to claim 3 wherein said means for adding includes means for adding one escapement unit from said remainder beginning in the direction of said initial scanning.

5. A system according to claim 4 including means for alternating the end of succeeding lines at which scanning is to begin.

6. A method of justifying text lines made up of characters, words, and spaces for printing with a system having a printer having a minimum escapement unit differing from a minimum escapement unit for said system; said method comprising:
    (a) scanning a system justified line to determine word space sizes in said line;
    (b) dividing each word space size by said printer minimum escapement unit to obtain a quotient and any remainder;
    (c) converting each space size so divided to a size including said quotient;
    (d) accumulating all remainders;
    (e) adding an accumulation of all remainders to a converted word space size.

7. A method according to claim 6 including converting the first word space encountered during scanning to a size including said accumulation of all remainders.

8. A method according to claim 7 including:
    (a) initially scanning said line to determine the number of word spaces in said line and the size of any residue in system minimum escapement units, said word spaces being a number of system minimum escapement units in size;
    (b) dividing said residue size by said number of word spaces to obtain a quotient and any remainder in system minimum escapement units; and
    (c) adding said quotient, and one escapement unit from said remainder until exhausted, to each word space on said line to justify said line.

9. A method according to claim 8 including adding one escapement unit from said remainder beginning in the direction of said initial scanning.

10. A method according to claim 9 including alternating the end of succeeding lines at which scanning is to begin.

* * * * *